United States Patent
Finamore et al.

(10) Patent No.: US 8,184,389 B2
(45) Date of Patent: May 22, 2012

(54) SENSOR RESONANT FREQUENCY IDENTIFICATION AND FILTER TUNING

(75) Inventors: David Finamore, Louisville, CO (US); Michael Dickeson, Westminster, CO (US); Naveen Viswanath, Denver, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1469 days.

(21) Appl. No.: 11/685,960

(22) Filed: Mar. 14, 2007

(65) Prior Publication Data

US 2007/0241711 A1 Oct. 18, 2007

Related U.S. Application Data

(60) Provisional application No. 60/774,887, filed on Apr. 14, 2006.

(51) Int. Cl.
*G11B 20/10* (2006.01)
(52) U.S. Cl. .......................................................... 360/39
(58) Field of Classification Search .................. 360/39, 360/43, 61, 65, 66
See application file for complete search history.

(56) References Cited

U.S. PATENT DOCUMENTS

| | | | | | |
|---|---|---|---|---|---|
| 4,448,059 | A | * | 5/1984 | Kondo et al. | 73/35.09 |
| 4,669,320 | A | * | 6/1987 | Simonsen | 73/862.59 |
| 5,146,776 | A | * | 9/1992 | Twerdochlib et al. | 73/1.85 |
| 5,332,061 | A | * | 7/1994 | Majeed et al. | 180/312 |
| 5,987,986 | A | * | 11/1999 | Wyse et al. | 73/504.12 |
| 6,231,520 | B1 | * | 5/2001 | Maezawa | 600/552 |
| 6,576,968 | B2 | * | 6/2003 | Kvisteroey et al. | 257/417 |
| 6,598,479 | B1 | * | 7/2003 | Robinson et al. | 73/658 |
| 6,675,652 | B2 | * | 1/2004 | Yamazaki | 73/504.16 |
| 6,892,581 | B2 | * | 5/2005 | Robinson et al. | 73/658 |
| 2003/0084722 | A1 | * | 5/2003 | Kim et al. | 73/504.08 |

* cited by examiner

*Primary Examiner* — Fred Tzeng
(74) *Attorney, Agent, or Firm* — Westman, Champlin & Kelly, P.A.

(57) ABSTRACT

Methods of tuning a notch filter to remove resonant frequency components from an output signal of a vibration sensor. Some methods according to the invention include exciting the vibration sensor with an excitation signal including energy in a frequency band that may include a resonant frequency of the vibration sensor, measuring the output signal of the vibration sensor in response to the excitation signal, detecting a frequency component of the output signal that corresponds to the resonant frequency of the vibration sensor, and configuring the notch filter to attenuate the detected frequency component. Related disk drives are also disclosed.

20 Claims, 7 Drawing Sheets

SENSOR RESONANT FREQUENCY IDENTIFICATION AND FILTER TUNING

RELATED APPLICATION

This application claims the benefit of and priority to U.S. Provisional Patent Application No. 60/744,887 titled "SENSOR RESONANT FREQUENCY IDENTIFICATION AND FILTER TUNING", filed Apr. 14, 2006, the disclosure of which is hereby incorporated herein by reference as if set forth in its entirety.

FIELD OF THE INVENTION

The present invention generally relates to electronic devices including vibration sensors and, more particularly, to methods, apparatus, and computer program products for characterizing a vibration sensor in a digital data storage device.

BACKGROUND

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

As the transducer approaches the destination track, the servo system initiates a settle mode to bring the transducer to rest over the destination track within a desired settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive. In particular, forces that can be exerted on the actuator can cause energy to be stored in the compliant mounting structure of the cabinet in which the disk drive is mounted. Such forces may be returned to the disk drive in the form of rotational vibration (also referred to herein as seek wind-up, which is a form of post-seek oscillation), which may cause the transducer to move away from a desired location on the disk.

Vibration in a disk drive may also be caused by rotation and spinning of other hard disk drives mounted in the same mounting frame, and/or may be imparted from other sources that are mechanically coupled to the disk drive. Techniques have been developed to address such vibration. In particular, acceleration feedforward techniques have been developed in which a signal detected at a vibration sensor mounted on the disk drive is added to a position error signal in a servo control loop.

SUMMARY

Some embodiments of the invention provide methods of tuning a notch filter to remove resonant frequency components from an output signal of a vibration sensor. Some methods according to the invention include exciting the vibration sensor with an excitation signal including energy in a frequency band that may include a resonant frequency of the vibration sensor, measuring the output signal of the vibration sensor in response to the excitation signal, detecting a frequency component of the output signal that corresponds to the resonant frequency of the vibration sensor, and configuring the notch filter to attenuate the detected frequency component.

Measuring the output signal of the vibration sensor may include sampling the output signal of the vibration sensor with an analog to digital converter to generate a digitized output signal.

Detecting the frequency component of the output signal may include generating a frequency-domain representation of the digitized output signal and locating a frequency in the frequency-domain representation of the digitized output signal having a relatively high energy level.

Generating the frequency-domain representation of the digitized output signal may include Fourier transforming the digitized output signal. Locating the frequency having a relatively high energy may include locating a frequency at which the frequency-domain representation of the digitized output signal has a local maximum.

Measuring the output signal of the vibration sensor may include filtering the output signal with a filter having a frequency response at a filter frequency to generate a filtered output signal and measuring the filtered output signal to determine a frequency component of the output signal of the vibration sensor at the filter frequency. The filter may include a bandpass filter and/or a notch filter.

The methods may further include digitizing the output signal to form a digitized output signal, filtering the output signal may include filtering the digitized output signal with a digital filter.

The digital filter may include a programmable digital filter, and the methods may further include programming the programmable digital filter with a first digital filter frequency, filtering the digitized output signal with the programmable digital filter having the first digital filter frequency, measuring an output of the programmable digital filter having the first digital filter frequency to obtain a first output level, programming the programmable digital filter with a second digital filter frequency, filtering the digitized output signal with the programmable digital filter having the second digital filter frequency, measuring an output of the programmable digital filter having the second digital filter frequency to obtain a second output level, and comparing the first output level and the second output level to determine if the vibration sensor has a resonant frequency component at the first digital filter frequency or the second digital filter frequency.

Exciting the vibration sensor with an excitation signal may include moving an actuator arm of a head disk assembly of a disk drive until the actuator arm contacts a portion of the disk drive that is mechanically coupled to the vibration sensor, such as a crash stop.

Configuring the notch filter may include generating a set of filter coefficients for the notch filter that cause the notch filter to attenuate frequencies at the resonant frequency of the vibration sensor.

Some embodiments of the invention provide a method of identifying a manufacturer of a vibration sensor, including exciting the vibration sensor with an excitation signal including energy in a frequency band that may include a resonant frequency of the vibration sensor, measuring an output signal of the vibration sensor in response to the excitation signal, detecting a frequency component of the output signal that corresponds to a resonant frequency of the vibration sensor, and comparing the detected resonant frequency of the vibration sensor to a known resonant frequency corresponding to a manufacturer of vibration sensors, and responsive to the comparison of the detected resonant frequency to the known resonant frequency, determining if the vibration sensor was manufactured by the manufacturer of vibration sensors.

A disk drive according to some embodiments of the invention includes a head disk assembly (HDA) including a data storage disk, a transducer configured to read data from the disk and/or to write data to the data storage disk, and an actuator configured to position the transducer relative to the data storage disk, a vibration sensor positioned on the HDA and configured to generate a vibration signal in responese to a vibration of the HDA, a notch filter that is configured to attenuate frequency components of the vibration signal that are near a filter frequency of the notch filter, and a controller. The controller may be configured to excite the vibration sensor with an excitation signal including energy in a frequency band that may include a resonant frequency of the vibration sensor, measure the vibration signal of the vibration sensor in response to the excitation signal, detect a frequency component of the output signal that corresponds to the resonant frequency of the vibration sensor, and configure the notch filter to attenuate the detected frequency component.

The disk drive may further include an analog to digital converter that is configured to sample the vibration signal and to generate a digitized vibration signal.

The disk drive may further include an FFT controller configured to generate a frequency-domain representation of the digitized output signal and a peak detector configured to locate a frequency in the frequency-domain representation of the digitized vibration signal having a relatively high energy level. The peak detector may be configured to locate a frequency at which the frequency-domain representation of the digitized output signal has a local maximum.

The controller may be further configured to filter the output signal with a test filter having a frequency response at a test filter frequency to generate a filtered output signal, and to measure the filtered output signal to determine a frequency component of the output signal of the vibration sensor at the test filter frequency. The test filter may include a bandpass filter and/or a notch filter.

The HDA may further include an actuator arm assembly configured to rotate about a pivot point and the disk drive may further include a crash stop configured to limit rotary movement of the actuator arm assembly, the controller is configured to excite the vibration sensor by moving the actuator arm assembly until the actuator arm assembly contacts the crash stop.

Configuring the notch filter may include generating a set of filter coefficients for the notch filter that cause the notch filter to attenuate frequencies at the resonant frequency of the vibration sensor.

DETAILED DESCRIPTION OF EMBODIMENTS OF THE INVENTION

Figure 1:
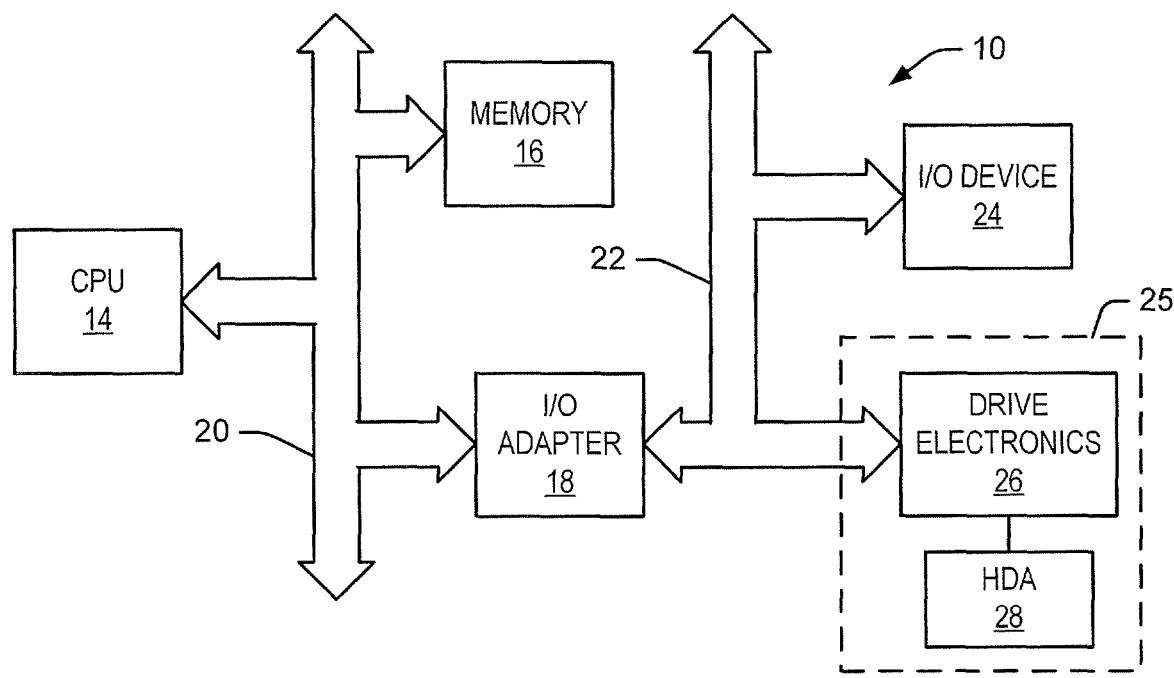
FIG. 1 is a block diagram of an exemplary computer system that includes a disk drive.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. The present invention may be embodied in hardware and/or in software (including firmware, resident software, micro-code, etc.). Consequently, as used herein, the term "signal" may take the form of a continuous waveform and/or discrete value(s), such as digital value(s) in a memory. Furthermore, although some of the diagrams include arrows on communication/operational paths to show a primary direction of communication/operation, it is to be understood that communication/operational may occur in the opposite direction to the depicted arrows.

As noted above, electronic devices, such as disk drives, may be subjected to vibration during operation. Such vibration may interfere with the operation of the electronic device. In the case of a disk drive, vibration may cause a read/write transducer to move away from a track on which data is being read/written. Off-track reads may result in incorrectly read data, and off-track writes may result in corrupted and/or lost data.

Vibration of a disk drive may be measured using a vibration sensor. The vibration signal from the vibration sensor may be combined with a position error signal used in a closed-loop feedback control system to maintain a read/write transducer at a desired location relative to the disk. In order to obtain an accurate vibration signal, however, it may be desirable to filter the vibration signal using a notch filter that is tuned to remove certain frequencies from the vibration signal. In particular, it may be desirable to remove frequencies that are at or near a resonant frequency of the vibration sensor, since such frequencies in the output of the vibration sensor may contain spurious and/or excessive energy.

Typically, the resonant frequency of a vibration sensor is specified by the sensor manufacturer, and a disk drive manufacturer designs and tunes a notch filter to remove frequencies around the resonant frequency specified by the sensor manufacturer. However, some problems may arise if the filter is tuned using the resonant frequency specified by the sensor manufacturer. First, the resonant frequency may not be specified by the sensor manufacturer with a high accuracy. Accordingly, the filter may be designed to remove a wide range of frequencies. Furthermore, the frequency response of a vibration sensor may change over time and/or with operating conditions. For example a sensor resonant frequency may be affected by operating parameters such as temperature, elevation, and/or humidity. Thus, a filter that is designed to remove particular frequencies may not accurately filter a vibration signal if the frequency response of the vibration sensor has changed over time.

Systems, methods and/or computer program products according to some embodiments of the invention provide automatic filter tuning based on measured resonant frequencies of vibration sensors. The resonant frequency of a sensor may be measured by exciting the sensor and sampling the sensor output signal in response to the excitation. The resonant frequency of vibration sensor may also be used to identify the type and/or manufacturer of a vibration sensor, which may permit the use of a simpler and/or less expensive filter, since a filter designed for specific type of identified vibration sensor may be used instead of a filter that can be used with a wide range of sensor types.

Referring to FIG. 1, an exemplary computer system 10 is shown that includes a central processing unit ("CPU") 14, a main memory 16, and an I/O (Input/Output) bus adapter 18, all interconnected by a system bus 20. Coupled to the I/O bus adapter 18 is an I/O bus 22, that may be, for example, a small computer system interconnect (SCSI) bus, firewire bus, and/or a universal serial bus. The I/O bus 22 supports various peripheral I/O devices 24 and a data storage unit such as a disk drive 25. The disk drive 25 includes drive electronics 26 and a head disk assembly 28 ("HDA").

Figure 2:
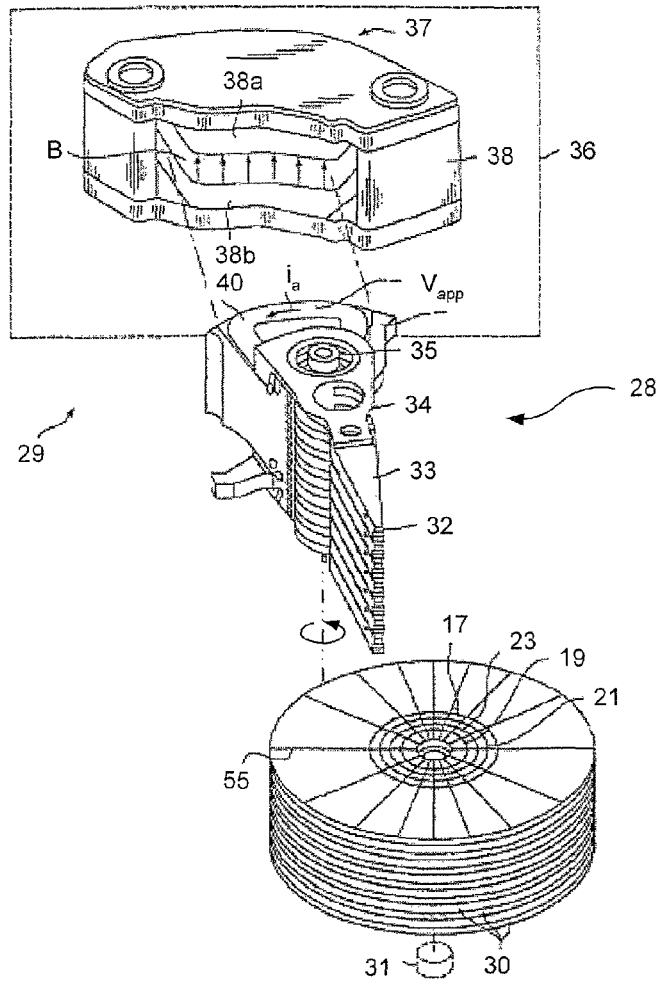
FIG. 2 is a diagram of an exemplary head disk assembly of a disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arm assembly 34. The actuator arm assembly 34 pivot about point 35 to move the load beams 33 in a radial direction over the storage surfaces of the disks 30, for example, from an initial track 19 towards a target track 21 shown in FIG. 2. At the target track 21, the magnetic transducers 32 can read from and/or write data on the disks 30. A motor, such as a voice coil motor (VCM) 36 controls the radial movement of the actuator arm assembly 34 in proportion to an input actuator current $i_a$. Although the disks 30 are described as magnetic disks for purposes of illustration, the disks 30 may alternatively be optical disks or any other type of storage disk which can have data storage tracks defined on one or more storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arm assembly 34 resulting in radial motion of the arms 34 about pivot point 35. The polarity of the input actuator current $i_a$ determines the direction of radial motion of the actuator arm assembly 34.

The radial motion of the actuator arm assembly 34 may be transmitted into a compliant mounting structure of the cabinet in which the disk drive 25 is mounted. The energy may be stored in the cabinet and returned to the disk drive 25 as rotational vibration. As noted above, as the transducers 32 approach the target track 21, the servo system initiates a settle mode to bring the transducers 32 to rest over the target track 21 within a desired settle threshold. The time required for the transducers 32 to come to rest over the destination track may be referred to as the "settle time" or "settle period." Because energy may be stored in the cabinet during the seek operation, rotational vibration caused by such energy (i.e. seek wind-up) may be particularly problematic during the settle period.

Seek wind-up may vary in both magnitude and/or frequency from cabinet to cabinet, and even from slot to slot in the same cabinet. Excessive amounts of seek wind-up can lead to large performance variability in drives, which may lead to greatly reduced data transfer rates. Other types of vibration, such as external vibration imparted to the disk drive from an external source, may affect the settle time.

FIG. 2 further illustrates tracks and sectors on the disks 34. Data is stored on the disks 34 within a number of concentric tracks 40 (or cylinders). Each track 40 is divided into a plurality of radially extending sectors 42. Each sector is further divided into a plurality of data sectors defined between adjacent servo spokes. The servo spokes are used to, among other things, accurately position the head 20 so that data can be properly written onto and read from a selected track. The data sectors are where non-servo related data (i.e., host device data) is stored and retrieved.

Figure 3:
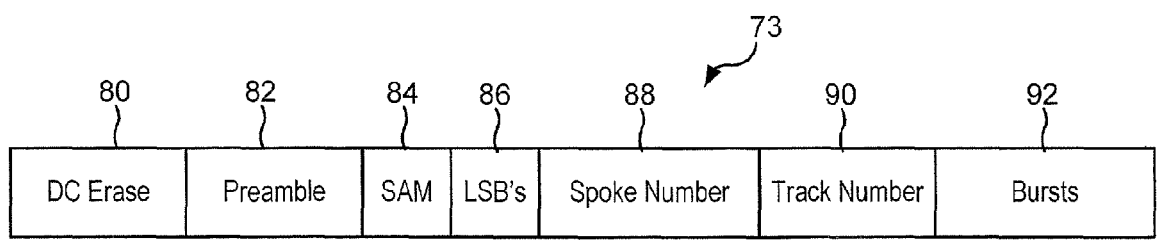
FIG. 3 illustrates exemplary servo information that may be stored in at least some of the servo spokes of a disk drive.

FIG. 3 illustrates exemplary servo information 73 that may be stored in at least some of the servo spokes within the radial sectors 42. The servo information 73 can include a DC erase field 80, a preamble field 82, a servo address mark (SAM) field 84, a track number field indicated by its least significant bits (LSBs) 86, a spoke number field 88, an entire track number field 90 which may be recorded in at least one of the servo spokes, and a servo burst field 92 of circumferentially staggered radially offset servo bursts (e.g., A, B, C, D servo bursts).

Figure 4:
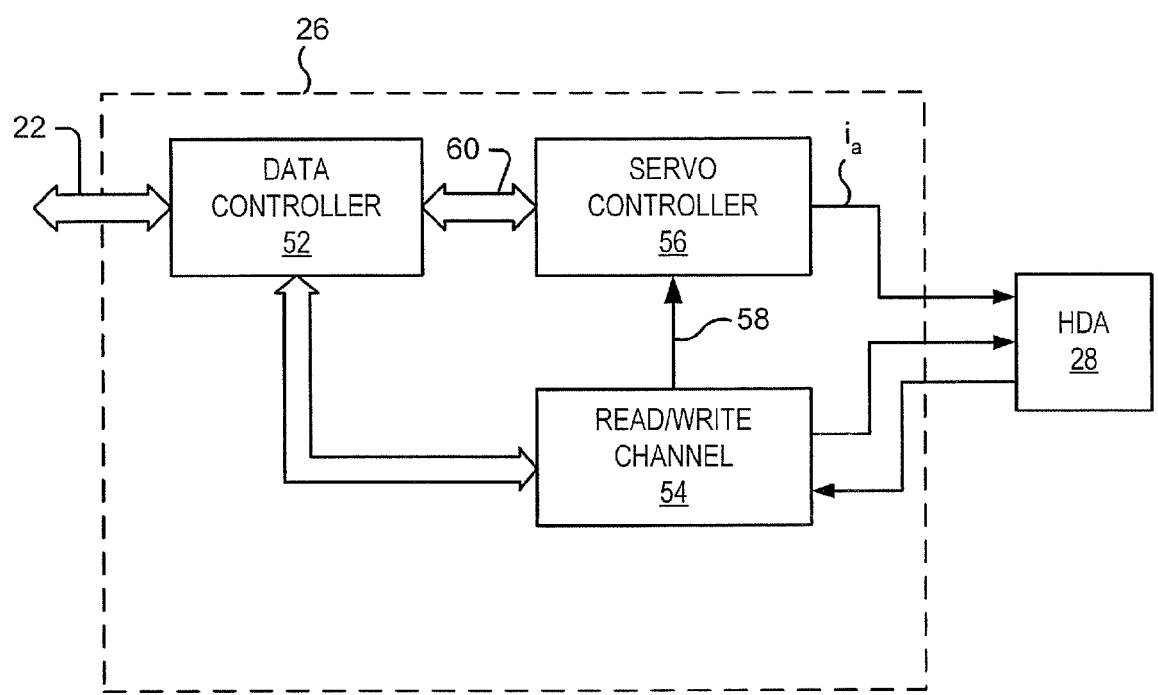
FIG. 4 is a block diagram illustrating methods and/or drive electronics of a disk drive according to some embodiments of the present invention.

FIG. 4 is a block diagram of a portion of the drive electronics 26 of the disk drive 25 shown in FIG. 1 that is communicatively connected to a host device 10 and configured to operate in accordance with some embodiments, and associated methods thereof. The drive electronics 26 can include a data controller 52, a servo controller 56, and a read write channel 54. Although the controllers 52 and 56, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 28 can include a plurality of the disks 30, a plurality of the transducers 32 mounted to the actuator arm assembly 34 and positioned adjacent to different data storage surfaces of the disks 30, the VCM 28, and the spindle motor 31.

A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducers 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducers 32 in relation to that track and data block within the track. The transducer location information is induced into the transducers 32, converted from analog signals to digital data in the read/write channel 54, and transferred to the servo controller 56. The servo controller 56 can use the transducer location information for performing seek and tracking operations of the transducers 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command that is converted into the input actuator current $i_a$, and provided to the actuator 29 to move the transducers 32 radially across the disk 30. The seek time is thereby dependent on the magnitude of the current command. The energy imparted by the actuator arm assembly 34 to the housing (which is later returned to the drive 25 as rotational vibration) is also dependent on the magnitude of the current command.

Figure 5:
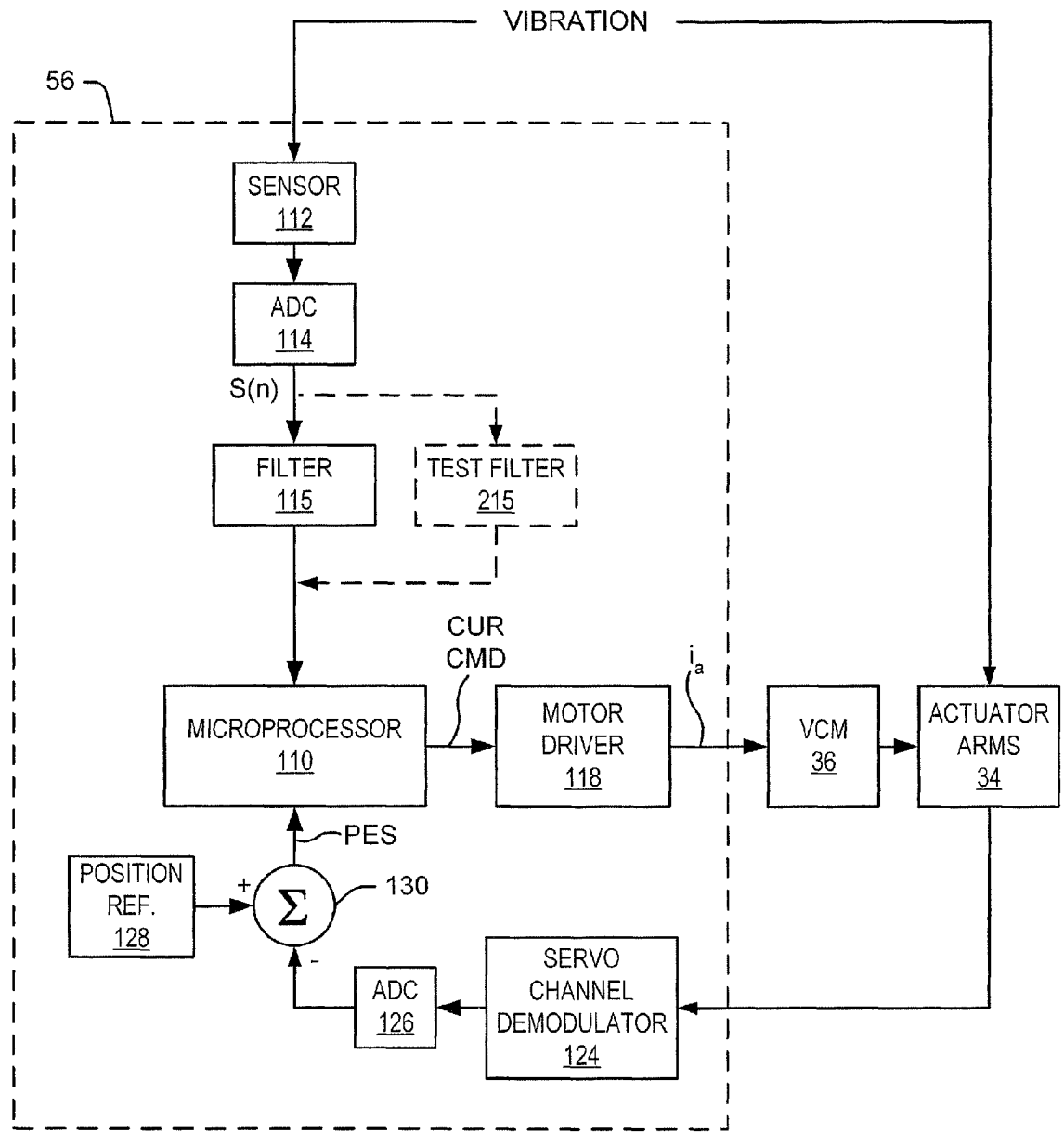
FIG. 5 is a block diagram illustrating servo controller apparatus and methods according to some embodiments of the present invention.

FIG. 5 is a block diagram of a servo controller 56 illustrating systems and/or methods according to some embodiments of the invention. As shown therein, a servo controller 56 includes a microprocessor 110 which is configured to generate a current command signal CUR CMD which is provided to a motor driver circuit 118. The motor driver circuit 118 converts the current command into an input actuator current signal $i_a$, which is provided to the voice coil motor VCM 36. As discussed above, the VCM 36 moves the actuator arm assembly 34 in response to the input actuator current signal $i_a$. A servo channel demodulator 124 generates a servo signal that is proportional to the position of the actuator arm assembly 34 relative to the servo bursts on the disk. The servo signal is digitized by an analog to digital converter 126 and subtracted at a summing node 130 from a position reference signal generated by a position reference generator 128. Accordingly, the servo channel demodulator 124, the analog to digital converter 126, the position reference generator 128 and the summing node 130 form a position error sensor that is configured to generate a position error signal (PES) indicative of a difference between a desired position of a selected one of the transducers 32 and an actual position of the selected transducer 32 relative to a track of the data storage disk 30. The position error signal is provided to the microprocessor 110, which uses the PES to control the current command, to thereby adjust the position of the transducers 32 relative to the target track 21.

The servo controller 56 further includes a vibration sensor 112, which generates a vibration signal in response to sensed vibration energy associated with the disk drive 25. The vibration sensor 112 may include, for example, a piezoelectric transducer that generates an electric signal in response to physical acceleration. As shown in FIG. 5, the vibration energy may be experienced by both the vibration sensor 112 and by the actuator arm assembly 34. The vibration signal is sampled by an analog to digital converter 114, which outputs a digital vibration signal S(n). The vibration signal S(n) may be amplified by the controller 110 and added to the position error signal PES as an acceleration feedforward (AFF) signal to compensate in advance for vibration experienced by the actuator arm assembly 34.

The vibration signal may be filtered by a filter 115 to attenuate unwanted high frequency sensor noise, such as signal energy in or near the resonant frequency of the filter 115. Accordingly, the filter 115 may be implemented as a notch filter that is designed to pass a wide range of frequencies, but to attenuate frequencies at or near a notch frequency.

As noted above, the resonant frequency of a vibration sensor may be specified by the sensor manufacturer. Thus, the filter 115 may be tuned to attenuate frequencies around the resonant frequency specified by the sensor manufacturer. However, if the resonant frequency is not specified with a high accuracy, the filter 115 may not accurately filter out the appropriate frequencies. Furthermore, the frequency response of the vibration sensor 112 may change over time and/or with operating conditions, such as temperature, elevation, and/or humidity.

In order to accurately ascertain the resonant frequency of the sensor 112 and to configure the filter 115 to attenuate the appropriate frequencies, the servo controller 56 can carry out a calibration process to determine a resonant frequency of the sensor 112.

In the calibration process, the sensor 112 may be excited with an excitation signal, and the frequency response of the sensor 112 may be measured by the filter 115, the microprocessor 110 and/or an optional test filter 215. For example, the microprocessor 110 may generate a vibration that excites the sensor 112 by causing the VCM 36 to generate a known or expected vibration of the sensor 112. The output of the sensor 112 in response to the excitation may be sampled and analyzed by the microprocessor 110 to determine a resonant frequency of the sensor 112. The microprocessor 110 may then use the determined resonant frequency to set filter coefficients of the filter 115 that cause the filter 115 to attenuate the appropriate frequencies in the sensor output signal S(n).

Figure 6:
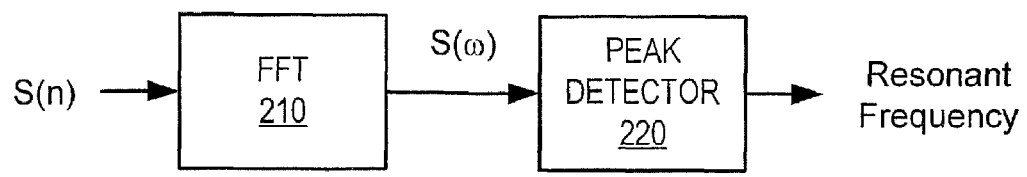
FIG. 6 is a block diagram illustrating systems and methods for processing a sensor output signal according to embodiments of the invention.

In particular, as shown in FIG. 6, the sensor output signal S(n) may be processed by a Fast Fourier Transform (FFT) processor 210, which generates a frequency-domain representation S(ω) of the sensor output signal S(n). The frequency-domain representation S(ω) is then processed by a peak detector 220, which is configured to locate a peak in the frequency-domain representation. The peak may represent a resonant frequency of the vibration sensor 112.

The microprocessor 110 may excite the vibration sensor 112 by, for example, moving the actuator arm assembly 34 of the HDA 26 until the actuator arm assembly 34 contacts a fixed portion of the HDA 28, such as a crash stop. For example, referring to FIG. 7, the HDA 28 may be provided with one or more crash stops 250, 255 that are configured to restrict the actuator arm assembly 34 from moving too far in either a clockwise or counter-clockwise direction, for example to prevent the read/write transducers 32 from striking the disk spindle 46, the housing 11 of the disk drive 25 and/or other components within the housing 11.

Figure 7:
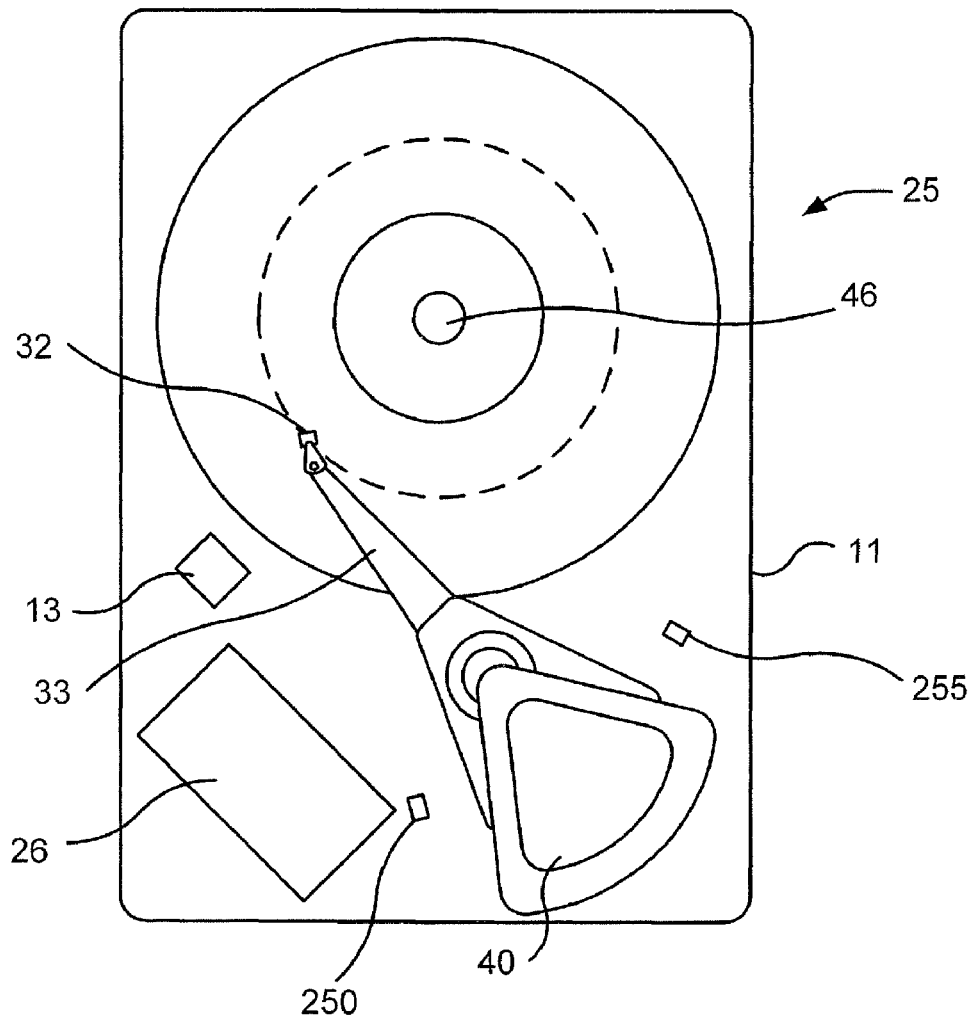
FIG. 7 is a schematic diagram of a disk drive configured according to some embodiments of the invention.

In particular, the disk drive 25 may include an inner diameter stop 250, as well as an outer diameter stop 255, to limit the rotary travel of the actuator arm assembly 34. Referring to FIG. 7, the inner diameter stop 250 and the outer diameter stop 255 are secured to the drive housing 11. The inner diameter stop 250 may prevent the actuator arm assembly 34 from crashing the transducers 32 into the disk spindle 46. The outer diameter stop 255 may prevent the actuator arm assembly 34 from moving the transducers 32 radially outward past a landing zone 13.

Accordingly, in order to excite the vibration sensor 112, the microprocessor 110 may move the actuator arm assembly 34 of the HDA 28 until the actuator arm assembly 34 contacts one of the crash stops 250, 255. Since the crash stops 250, 255 are affixed to the housing 11, contacting a crash stop 250, 255 causes a mechanical shock to the disk drive housing 11, which may be detected by the vibration sensor 112. In particular, contacting a crash stop 250, 255 may generate a quasi-impulse excitation that approximates an impulse excitation to the vibration sensor 112. An impulse excitation is a brief, high energy excitation signal that contains a broad frequency content. In response to the quasi-impulse excitation signal, the output vibration sensor 112 may oscillate at a resonant frequency of the sensor 112.

Figure 8:
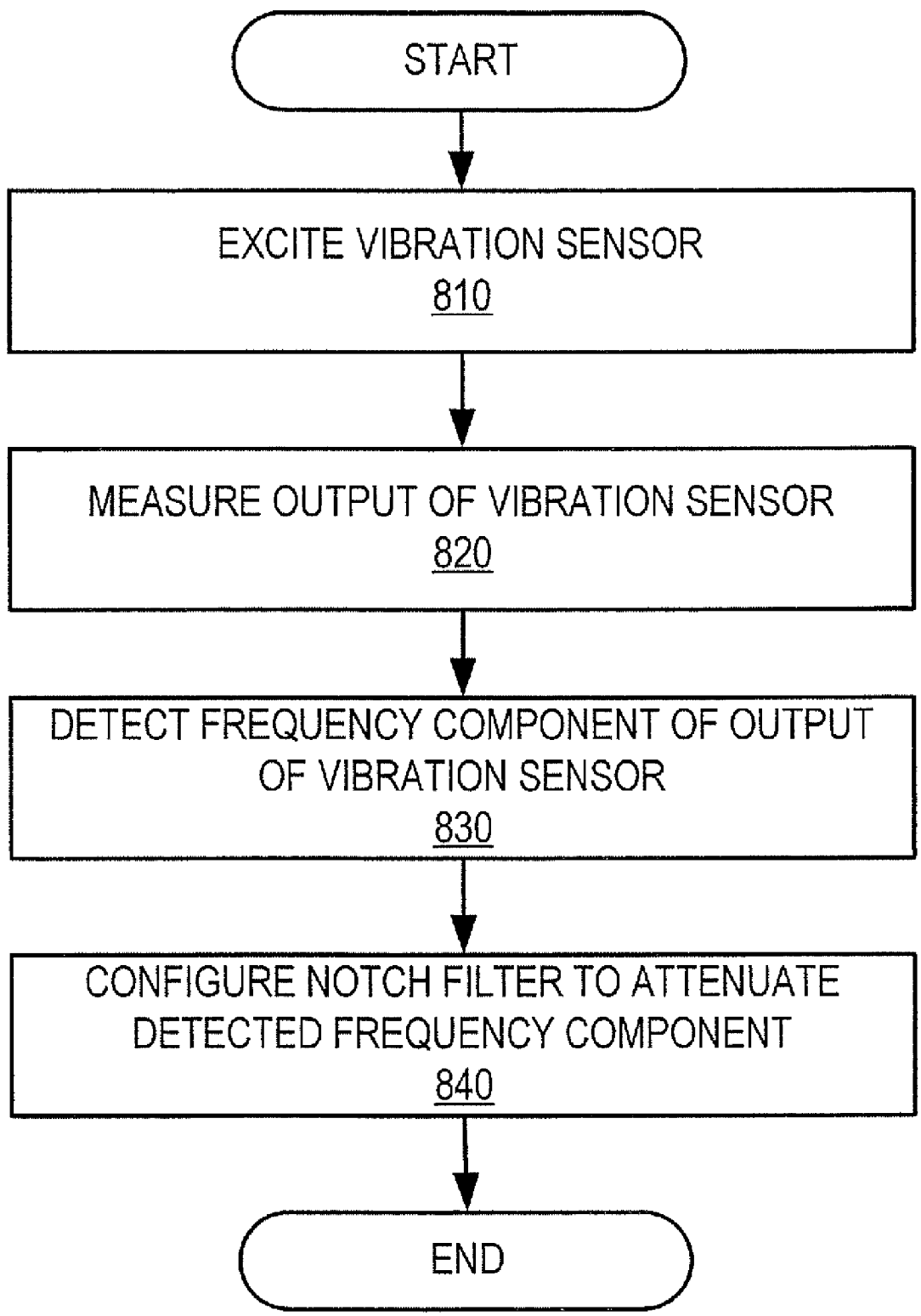
FIGS. 8 and 9 are flowcharts showing operations associated with gain adaptation according to some embodiments of the invention.

Some embodiments of the invention are illustrated in the flowchart of FIG. 8. As shown therein (and with reference to FIGS. 5 and 7), the servo controller 56 may excite the vibration sensor 112, for example by causing the actuator arm assembly 34 to contact a crash stop 250, 255 to generate a quasi-impulse vibration excitation (block 810). The servo controller 56 may then measure the output of the vibration sensor 112 (block 820) and detect a frequency component of the output of the vibration sensor 112 (block 830). In particular, the servo controller 56 may detect a peak frequency in the output of the vibration sensor 112 in response to the quasi-impulse excitation. The servo controller 56 may then configure the filter 115 as a notch filter to attenuate frequencies at or near the detected frequency (block 840). The servo controller 56 may configure the filter 115, for example, by generating appropriate filter coefficients and loading the filter coefficients into the filter 115.

Figure 9:
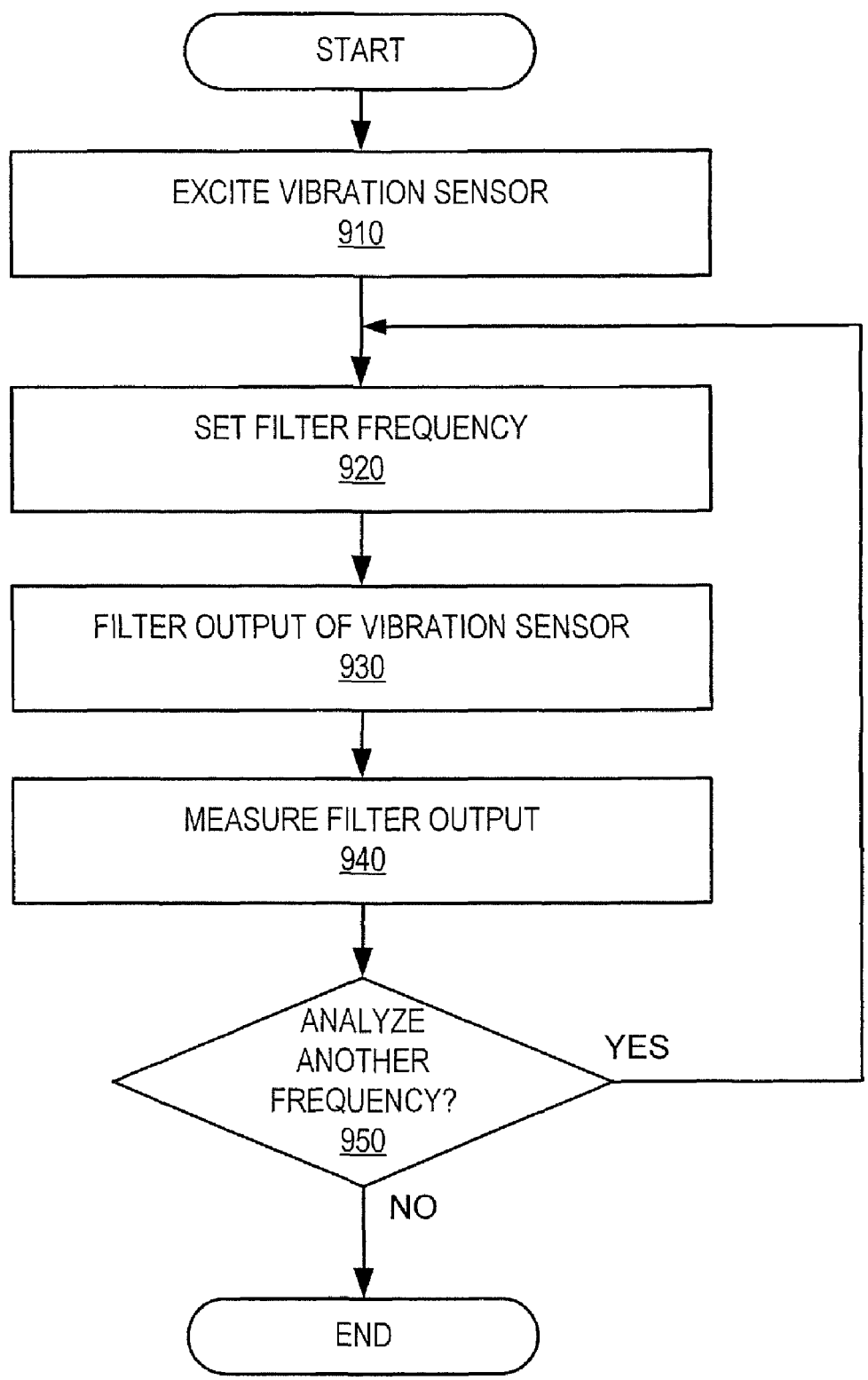

Further embodiments of the invention are illustrated in the flowchart of FIG. 9. In particular, instead of performing an FFT analysis of the output signal S(n) of the vibration sensor 112, which may be computationally expensive, the servo controller 56 may determine the resonant frequency of the vibration sensor 112 by exciting the vibration sensor 112 and iteratively filtering the output of the vibration sensor 112 and measuring the filtered output signal. For example, referring to FIG. 9, the servo controller 56 may excite the vibration sensor 112 with a quasi-impulse excitation signal as described above (block 910). The servo controller 56 may configure the filter 115 to block/pass a particular frequency band (block 920). In some embodiments, the servo controller 56 may configure the filter 115 as a notch filter and set the notch frequency at a first frequency. In other embodiments, the servo controller 56 may configure the filter 115 as a bandpass filter and set the bandpass frequency at a first frequency.

The filter 115 then filters the output of the vibration sensor 112 (block 930) and provides the filtered output signal to the microprocessor 110, which measures the filter output, for example to determine the total amount of energy in the output signal (block 940). The servo controller 56 may then determine if analysis of the output signal at another filter frequency should be performed (block 950). If so, operations return to block 920, where the servo controller 56 reconfigures the filter 115 to have a second filter frequency (e.g. notch frequency or bandpass frequency) and filters the output of the vibration sensor 112 with the reconfigured filter 115. While not shown in FIG. 9, the servo controller 56 may re-excite the vibration sensor 112 prior to filtering the output of the vibration sensor 112 with the reconfigured filter 115.

The servo controller 56 measures the output of the reconfigured filter (block 940), and may compare the output of the filter 115 configured with the first filter frequency to the output of the filter 115 configured with the second filter frequency to determine if the resonant frequency of the vibration sensor 112 is at the first filter frequency or the second filter frequency.

In embodiments in which the filter 115 is configured as a notch filter for purposes of the iterative analysis illustrated in FIG. 9, it may be expected that the total power of the signal output by the filter 115 will be at a minimum when the notch frequency of the filter 115 is near the resonant frequency of the vibration sensor 112. Conversely, in embodiments in which the filter 115 is configured as a bandpass filter, it may be expected that the total power of the signal output by the filter 115 will be at a maximum when the bandpass frequency of the filter 115 is near the resonant frequency of the vibration sensor 112. This analysis may be repeated over a range of filter frequencies to ascertain the resonant frequency of the sensor 112.

In some embodiments, an optional test filter 215 may be used to determine the resonant frequency of the sensor 112. For example, the test filter 215 may be designed as a bandpass filter, while the filter 115 may be designed as a notch filter. However, as described above, the filter 112 may be used as a test filter.

Embodiments of the invention may be employed in any electronic and/or electromechanical device that includes a vibration sensor. Furthermore, embodiments of the invention may be advantageously employed in a manufacturing environment to identify a manufacturer and/or model of a vibration sensor. For example, if the manufacturer or model of a particular vibration sensor is not known, embodiments of the invention may be used to identify the manufacturer or model of the vibration sensor by determining the resonant frequency of the vibration sensor and comparing the resonant frequency of the vibration sensor to know and resonant frequencies specified by manufacturers of vibration sensors.

Some embodiments of the present invention may be employed to calibrate the filter 115 of a disk drive 25 at the manufacturing stage. By providing automatic calibration of the filter 115 in response to a detected resonant frequency of the vibration sensor 112, it may not be necessary to keep track of the manufacturer, model and/or lot number the vibration sensors installed in disk drives, which may simply by the manufacturing process. Furthermore, vibration sensors having a wider tolerance may be used in the manufacture of disk drives, since the actual resonant frequency of the sensor may be characterized and used to calibrate the filter 115 according to some embodiments of the invention.

In addition, because the components that are used in embodiments of the present invention to determine the resonant frequency of vibration sensor may be included within a hard drive, it may be possible to periodically recalibrate the filter 115 to adjust for changes in the resonant frequency of vibration sensor 112. For example, the resonant frequency of the vibration sensor may be detected after a given number of operational hours, after a given number of spin-ups of the hard drive (or at each spin-up), and/or based on some other event. In some embodiments, the resonant frequency of the vibration sensor 112 may be detected, and the filter 115 recalibrated, if the average vibration signal output by the vibration sensor 112 exceeds a threshold level for a given period of time and/or if it is determined that the position error of the transducers 32 is not being adequately compensated by the vibration signal.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of tuning a notch filter to remove resonant frequency components from an output signal of a vibration sensor, comprising:
   exciting the vibration sensor with an excitation signal including energy in a frequency band that includes a resonant frequency of the vibration sensor;
   measuring the output signal of the vibration sensor in response to the excitation signal;
   detecting a frequency component of the output signal that corresponds to the resonant frequency of the vibration sensor; and
   configuring the notch filter to attenuate the detected frequency component.

2. The method of claim 1, wherein measuring the output signal of the vibration sensor comprises sampling the output signal of the vibration sensor with an analog to digital converter to generate a digitized output signal; and
   wherein detecting the frequency component of the output signal comprises generating a frequency-domain representation of the digitized output signal and locating a frequency in the frequency-domain representation of the digitized output signal having a relatively high energy level.

3. The method of claim 2, wherein generating the frequency-domain representation of the digitized output signal comprises Fourier transforming the digitized output signal.

4. The method of claim 2, wherein locating the frequency having a relatively high energy comprises locating a frequency at which the frequency-domain representation of the digitized output signal has a local maximum.

5. The method of claim 1, wherein measuring the output signal of the vibration sensor comprises filtering the output signal with a filter having a frequency response at a filter frequency to generate a filtered output signal and measuring the filtered output signal to determine a frequency component of the output signal of the vibration sensor at the filter frequency.

6. The method of claim 5, wherein the filter comprises a bandpass filter.

7. The method of claim 5, wherein the filter comprises a notch filter.

8. The method of claim 5, further comprising digitizing the output signal to form a digitized output signal, wherein filtering the output signal comprises filtering the digitized output signal with a digital filter.

9. The method of claim 8, wherein the digital filter comprises a programmable digital filter, the method further comprising:
   programming the programmable digital filter with a first digital filter frequency;
   filtering the digitized output signal with the programmable digital filter having the first digital filter frequency;
   measuring an output of the programmable digital filter having the first digital filter frequency to obtain a first output level;
   programming the programmable digital filter with a second digital filter frequency;
   filtering the digitized output signal with the programmable digital filter having the second digital filter frequency;
   measuring an output of the programmable digital filter having the second digital filter frequency to obtain a second output level; and
   comparing the first output level and the second output level to determine if the vibration sensor has a resonant frequency component at the first digital filter frequency or the second digital filter frequency.

10. The method of claim 1, wherein exciting the vibration sensor with an excitation signal comprises moving an actuator arm of a head disk assembly of a disk drive until the actuator arm contacts a portion of the disk drive that is mechanically coupled to the vibration sensor.

11. The method of claim 10, wherein the portion of the disk drive that is mechanically coupled to the vibration sensor comprises a crash stop.

12. The method of claim 1, wherein configuring the notch filter comprises generating a set of filter coefficients for the notch filter that cause the notch filter to attenuate frequencies at the resonant frequency of the vibration sensor.

13. A method of identifying a manufacturer of a vibration sensor, comprising:
   exciting the vibration sensor with an excitation signal including energy in a frequency band that includes a resonant frequency of the vibration sensor;
   measuring an output signal of the vibration sensor in response to the excitation signal;
   detecting a frequency component of the output signal that corresponds to a resonant frequency of the vibration sensor; and comparing the detected resonant frequency of the vibration sensor to a known resonant frequency corresponding to a manufacturer of vibration sensors; and responsive to the comparison of the detected resonant frequency to the known resonant frequency, determining if the vibration sensor was manufactured by the manufacturer of vibration sensors.

14. A disk drive comprising:

a head disk assembly (HDA) including a data storage disk, a transducer configured to read data from the disk and/or to write data to the data storage disk, and an actuator configured to position the transducer relative to the data storage disk;

a vibration sensor mechanically connected to the HDA and configured to generate a vibration signal in response to a vibration of the HDA;

a notch filter that is configured to attenuate frequency components of the vibration signal that are near a filter frequency of the notch filter; and a controller that is configured to:

excite the vibration sensor with an excitation signal including energy in a frequency band that includes a resonant frequency of the vibration sensor;

measure the vibration signal of the vibration sensor in response to the excitation signal;

detect a frequency component of the output signal that corresponds to the resonant frequency of the vibration sensor; and configure the notch filter to attenuate the detected frequency component.

15. The disk drive of claim 14, further comprising:

an analog to digital converter that is configured to sample the vibration signal and to generate a digitized vibration signal;

an FFT controller configured to generate a frequency-domain representation of the digitized output signal; and a peak detector configured to locate a frequency in the frequency-domain representation of the digitized vibration signal at which the frequency-domain representation of the digitized output signal has a local maximum.

16. The disk drive of claim 14, wherein the controller is further configured to filter the output signal with a test filter having a frequency response at a test filter frequency to generate a filtered output signal, and to measure the filtered output signal to determine a frequency component of the output signal of the vibration sensor at the test filter frequency.

17. The disk drive of claim 16, wherein the test filter comprises a bandpass filter.

18. The disk drive of claim 16, wherein the test filter comprises a notch filter.

19. The disk drive of claim 14, wherein the HDA further comprises an actuator arm assembly configured to rotate about a pivot point and wherein the disk drive further comprises a crash stop configured to limit rotary movement of the actuator arm assembly, wherein the controller is configured to excite the vibration sensor by moving the actuator arm assembly until the actuator arm assembly contacts the crash stop.

20. The disk drive of claim 14, wherein configuring the notch filter comprises generating a set of filter coefficients for the notch filter that cause the notch filter to attenuate frequencies at the resonant frequency of the vibration sensor.

* * * * *